United States Patent
Huang et al.

(10) Patent No.: US 10,043,480 B2
(45) Date of Patent: Aug. 7, 2018

(54) INTER-DEVICE CONFLICT RESOLUTION ON A MULTIMEDIA LINK

(71) Applicant: Lattice Semiconductor Corporation, Portland, OR (US)

(72) Inventors: Jiong Huang, Sunnyvale, CA (US); Lei Ming, San Jose, CA (US); Gyudong Kim, Sunnyvale, CA (US); Young Il Kim, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 199 days.

(21) Appl. No.: 14/474,005

(22) Filed: Aug. 29, 2014

(65) Prior Publication Data
US 2016/0065356 A1    Mar. 3, 2016

(51) Int. Cl.
*H04J 3/00*      (2006.01)
*G09G 5/00*      (2006.01)
*G06F 13/362*    (2006.01)
*G06F 13/42*     (2006.01)

(52) U.S. Cl.
CPC .......... *G09G 5/006* (2013.01); *G06F 13/362* (2013.01); *G06F 13/4265* (2013.01); *G09G 2370/06* (2013.01); *G09G 2370/12* (2013.01)

(58) Field of Classification Search
CPC ................... H04W 28/044–28/046; H04J 3/00
See application file for complete search history.

(56) References Cited

U.S. PATENT DOCUMENTS

| | | | |
|---|---|---|---|
| 2003/0002449 A1* | 1/2003 | Rittle | H04L 1/1671 370/277 |
| 2005/0105504 A1* | 5/2005 | Sakoda | H04L 1/0002 370/349 |
| 2006/0206634 A1* | 9/2006 | Torisaki | G06F 13/28 710/22 |
| 2012/0072629 A1* | 3/2012 | Tokuda | G06F 13/364 710/110 |
| 2013/0073775 A1* | 3/2013 | Wade | H04N 7/181 710/316 |
| 2016/0065356 A1* | 3/2016 | Huang | H04L 5/16 370/296 |
| 2016/0366472 A1* | 12/2016 | Ichimura | G09G 5/006 |

* cited by examiner

*Primary Examiner* — Andrew W Chriss
*Assistant Examiner* — Kenan Cehic
(74) *Attorney, Agent, or Firm* — Fenwick & West LLP (57) ABSTRACT

A source device communicates multimedia data to a sink device over a multimedia channel of a multimedia link. The source device comprises an interface to a full duplex control channel of the multimedia link. The source device also comprises first arbitration logic to control transfer of control data with the sink device via the full duplex control channel. The first arbitration logic ignores requests to receive inbound control data from the sink device while the source device is transmitting outbound control data to the sink device. The sink device, on the other hand, comprises second arbitration logic to control transfer of control data with the source device via the full duplex control channel. The second arbitration logic stops transmitting outbound control data via the full duplex control channel responsive to receiving a request to receive incoming control data from the source device.

16 Claims, 11 Drawing Sheets

INTER-DEVICE CONFLICT RESOLUTION ON A MULTIMEDIA LINK

TECHNICAL FIELD

The disclosed embodiments relate generally to Multimedia High Definition Link (MHL) standards, and more specifically to methods and devices that provide backward compatibility between MHL 3 devices and legacy MHL software.

BACKGROUND

Under the legacy MHL 1/2 protocol, a local MHL device communicates with a peer MHL device using a legacy MHL (MHL 1/MHL 2) link. The legacy link, in turn, has a half-duplex legacy control bus that enables exchange of control packets between the local and peer MHL devices. Additionally, in a legacy MHL device, legacy device software interfaces with a half duplex translation layer and therefore also receives or transmits control data in half duplex. Thus, in the legacy MHL 1/2 configuration, the local MHL device, the peer legacy device, the local and peer device software, as well as the legacy MHL control bus are all configured to operate in half-duplex.

Under the MHL 3 protocol, a local MHL 3 device communicates with a peer MHL 3 device using an MHL 3 link that includes a full-duplex enhanced control bus (eCBUS). Additionally, the MHL 3 device has the capability to interface with legacy MHL software through a half-duplex translation layer. But the half duplex nature of the translation layer could result in data transfer conflict, for instance, when packet receive requests arrive at the local MHL 3 device while the local device is already in the process of transmitting control data to a peer device.

SUMMARY

Accordingly, some embodiments provide a source device for communicating over a multimedia link. The source device comprises a half duplex translation layer, a link layer for coupling to a full duplex control channel of the multimedia link, and an arbitration logic to control transfer of control data with a sink device via the full duplex control channel. The arbitration logic controls the source device to ignore requests to receive inbound control data from the sink device while the source device is transmitting outbound control data corresponding to the half-duplex translation layer to the sink device through the link layer. In some embodiments, the arbitration logic comprises a state machine that controls flow of control data between the half-duplex translation layer and the full-duplex link layer.

In some embodiments, the arbitration logic initializes a packet transmission event by entering one or more transmission states for transmitting outbound control data to the sink device; and during the one or more transmission states, the arbitration logic receives a request to receive inbound control data from the sink device. In some embodiments, the one or more transmission states correspond to a header transmission state indicating a start of the packet transmission event, a higher order byte transmission state, a lower order byte transmission state, or a stop transmission state during which the source device awaits a positive or a negative acknowledgement signal from the sink device.

In some embodiments, the arbitration logic initializes a packet transmission event after asserting a transmission request signal to the link layer, and after receiving, from the link layer, a transmission grant signal authorizing access to the full duplex control channel.

In some embodiments, if the arbitration logic receives a request to receive inbound control data from the sink device after asserting a transmission request signal to the link layer of the source device and before receiving, from the link layer, a transmission grant signal, the arbitration logic aborts transmission by de-asserting the transmission request signal and processes the request to receive inbound control data from the sink device.

In some embodiments, responsive to receiving a request to receive inbound control data from the sink device, the arbitration logic determines whether the packet transmission event at the source device is completed; and in accordance with a determination that the packet transmission event is not completed, the arbitration logic ignores the request to receive inbound control data from the sink device by continuing the packet transmission event. In some embodiments, determining whether the packet transmission event at the source device is completed comprises determining whether a positive or a negative acknowledgement signal was received from the sink device corresponding to the packet transmission event.

Additionally, some embodiments provide a sink device for communicating over a multimedia link, the sink device comprising a half duplex translation layer; a link layer for coupling to a full duplex control channel of the multimedia link; and arbitration logic to control transfer of control data with the source device via the full duplex control channel. The arbitration logic aborts transmitting outbound control data via the full duplex control channel responsive to receiving a request to receive incoming control data from the source device. In some embodiments, responsive to receiving a request to receive incoming control data from the source device, the arbitration logic determines whether the packet transmission event at the sink device is completed; and in accordance with a determination that the packet transmission event is not completed, the arbitration logic suspends the packet transmission event to the source device by entering a transmission abort state and by initializing a packet receipt event to receive incoming control data from the source device. After completing the packet receipt event, the sink device may start to retransmit the aborted packet, if the transmit request from the translation layer is still asserted.

BRIEF DESCRIPTION OF THE DRAWINGS

Like reference numerals refer to corresponding parts throughout the drawings.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the invention and the described embodiments. However, the invention may be practiced without these specific details. In other instances, well-known methods, procedures, components, and circuits have not been described in detail so as not to unnecessarily obscure aspects of the embodiments.

Figure 1:
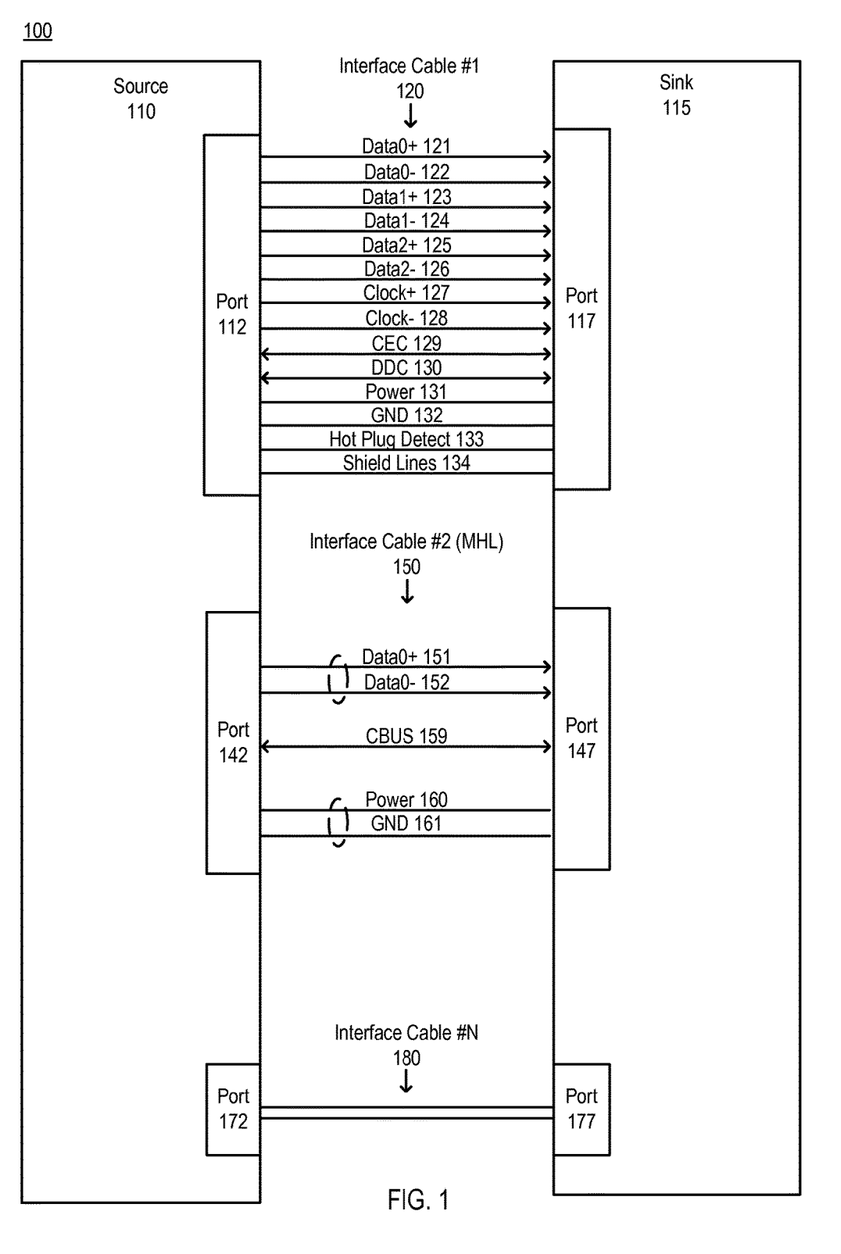
FIG. 1 includes a high-level block diagram of a system for data communications, according to some embodiments.

FIG. 1 is a high-level block diagram of a system 100 for data communications, according to one embodiment. The system 100 includes a source device 110 communicating with a sink device 115 through one or more interface cables 120, 150, 180. Source device 110 transmits multimedia data streams (e.g., audio/video/auxiliary streams) to the sink device 115 and also exchanges control data with the sink device 115 through the interface cables 120, 150, 180. In one embodiment, source device 110 and/or sink device 115 may be repeater devices.

Source device 110 includes physical communication ports 112, 142, 172 coupled to the interface cables 120, 150, 180. Sink device 115 also includes physical communication ports 117, 147, 177 coupled to the interface cables 120, 150, 180. Signals exchanged between the source device 110 and the sink device 115 across the interface cables pass through the physical communication ports.

Source device 110 and sink device 115 exchange data using various protocols. In one embodiment, interface cable 120 represents a High Definition Multimedia Interface (HDMI) cable. The HDMI cable 120 supports differential signals transmitted via data0+ line 121, data0− line 122, data1+ line 123, data1− line 124, data2+ line 125, and data2− line 126. The HDMI cable 120 may further include differential clock lines clock+ 127 and clock− 128; Consumer Electronics Control (CEC) control bus 129; Display Data Channel (DDC) bus 130; power 131, ground 132; hot plug detect 133; and four shield lines 134 for the differential signals. In some embodiments, the sink device 115 may utilize the CEC control bus 129 for the transmission of closed loop feedback control data to source device 110.

In one embodiment, interface cable 150 represents a Mobile High-Definition Link (MHL) cable. The MHL cable 150 supports differential signals transmitted, for example, via data0+ line 151, data0− line 152. Data lines 151 and 152 form a multimedia bus for transmission of multimedia data streams from the source device 110 to the sink device 115. In some embodiments of MHL, there may only be a single pair of differential data lines (e.g., 151 and 152). Alternatively, a plurality of differential data lines is provided to enable transmission (e.g., concurrently) of multiple differential signals on the multiple differential data lines. Embedded common mode clocks are transmitted through the differential data lines.

The MHL cable 150 may further include a control bus (CBUS) 159, power 160 and ground 161. The CBUS 159 is a bi-directional bus that carries control information such as discovery data, display identification, configuration data, and remote control commands. CBUS 159 for legacy MHL (MHL 1/2) operates in half duplex mode. On the other hand, CBUS 159 for MHL (MHL 3), alternatively referred to as an enhanced CBUS (eCBUS), operates in full duplex. In some embodiments, the eCBUS is single ended and provides single-ended signaling capability over a single signal wire. Alternatively, the eCBUS is differential ended (between differential lines eCBUS+ and eCBUS−) and provides differential-ended signaling capability over a differential pair of signal wires. An MHL 3 device (referred to herein as a local device) has the capability to interface with another MHL 3 device (referred to herein as a peer device) over a full duplex enhanced CBUS. For example, the source device 110 may be the local device if it is transmitting control information to the sink device 115. Alternatively, the sink device 115 may be the local device if it is transmitting control information to the source device 110.

Additionally, in the event that a local MHL 3 device needs to communicate with a legacy MHL device over a legacy MHL link or to operate with legacy MHL software, the local MHL 3 device has the capability to downgrade to a legacy operational mode from the MHL 3 mode. For example, a local MHL 3 device has the capability to interface with a peer MHL 1/2 device over a half-duplex CBUS.

Embodiments of the present disclosure relate to a system and MHL 3 device architecture for preserving backward compatibility with legacy MHL while allowing reuse of existing circuits and software that were used for legacy MHL. The MHL 3 device is configured to interface with a peer MHL 3 device over an MHL 3 link that includes a full-duplex enhanced control bus (eCBUS). Additionally, the MHL 3 device has the capability to interface with legacy MHL software through a half-duplex translation layer. However, data transfer conflict may arise at the half-duplex translation layer, for instance, when packet receive requests arrive at the local MHL 3 device while the translation layer is already in the process of transmitting control data to a peer device. Under these circumstances, the translation layer, by virtue of being half duplex, would be incapable of receiving the incoming packet while continuing in its own transmission. Embodiments of the disclosure relate to a set of predefined rules and priorities for data transfer between the source and sink devices that facilitate resolution of such conflict.

Figure 2:
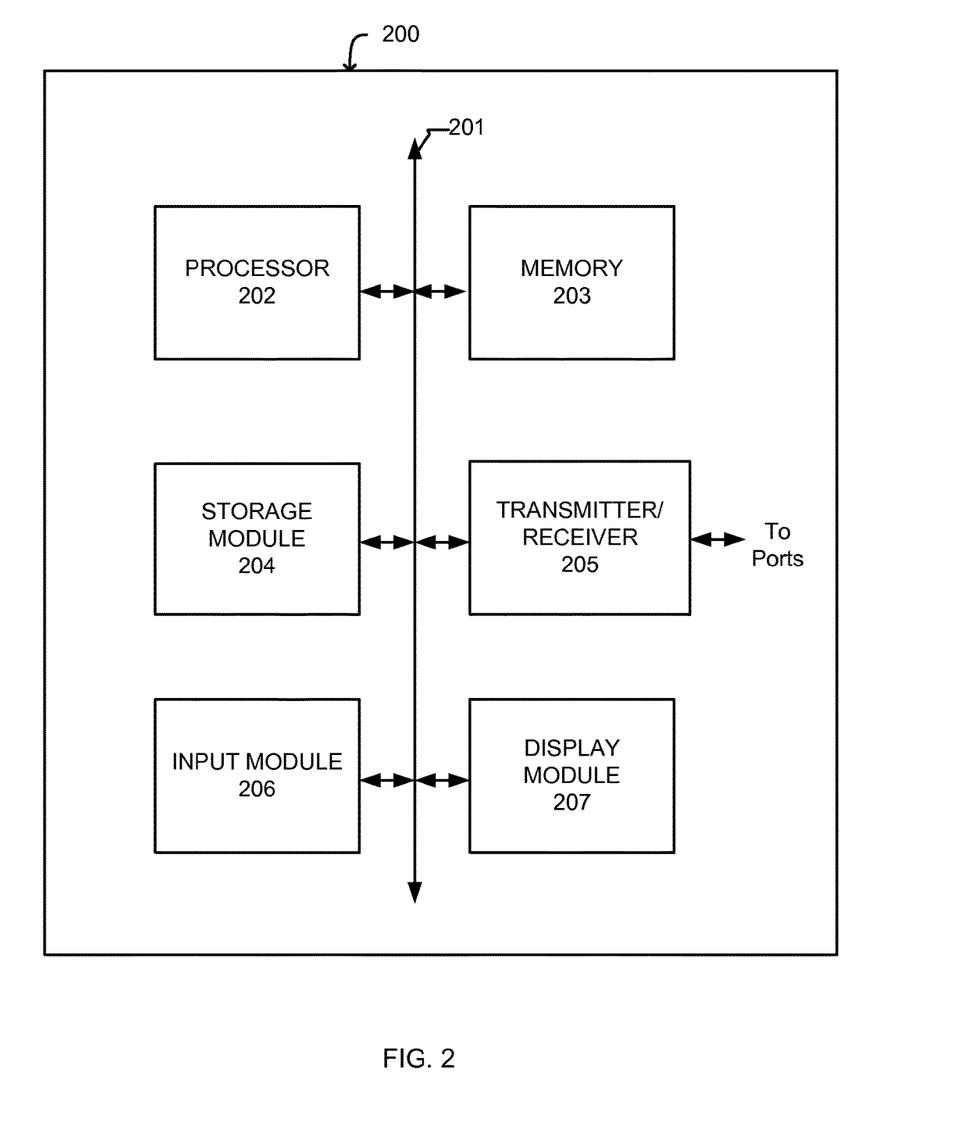
FIG. 2 includes a block diagram of a computing device suitable for use as a source device or sink device of FIG. 1, according to one embodiment.

FIG. 2 is a detailed view of a computing device 200 suitable for use as the source device 110 or sink device 115 from FIG. 1, according to one embodiment. The computing device 200 can be, for example, a cell phone, a television, a laptop, a tablet, etc. The computing device 200 includes components such as a processor 202, a memory 203, a storage module 204, an input module (e.g., keyboard, mouse, and the like) 206, a display module 207 (e.g. liquid crystal display, organic light emitting display, and the like) and a transmitter or receiver 205, exchanging data and control signals with one another through a bus 201.

The storage module 204 is implemented as one or more non-transitory computer readable storage media (e.g., hard disk drive, solid state memory, etc.), and stores software instructions that are executed by the processor 202 in conjunction with the memory 203. Operating system software and other application software may also be stored in the storage module 204 to run on the processor 202.

The transmitter or receiver 205 is coupled to the ports for reception or transmission of multimedia data and control data. Multimedia data that is received or transmitted may include video data streams or audio-video data streams or auxiliary data, such as HDMI and MHL data. The multimedia data may be encrypted for transmission using an encryption scheme such as HDCP (High-Bandwidth Digital-Content Protection).

In one embodiment, a representation of circuits within the source device 110 or sink device 115 may be stored as data in a non-transitory computer-readable medium (e.g. hard disk drive, flash drive, optical drive). These representations maybe in the form of, for example, behavioral level descriptions, register transfer level descriptions, logic component level descriptions, transistor level descriptions or layout geometry-level descriptions.

Multimedia Source and Sink Devices

Figure 3:
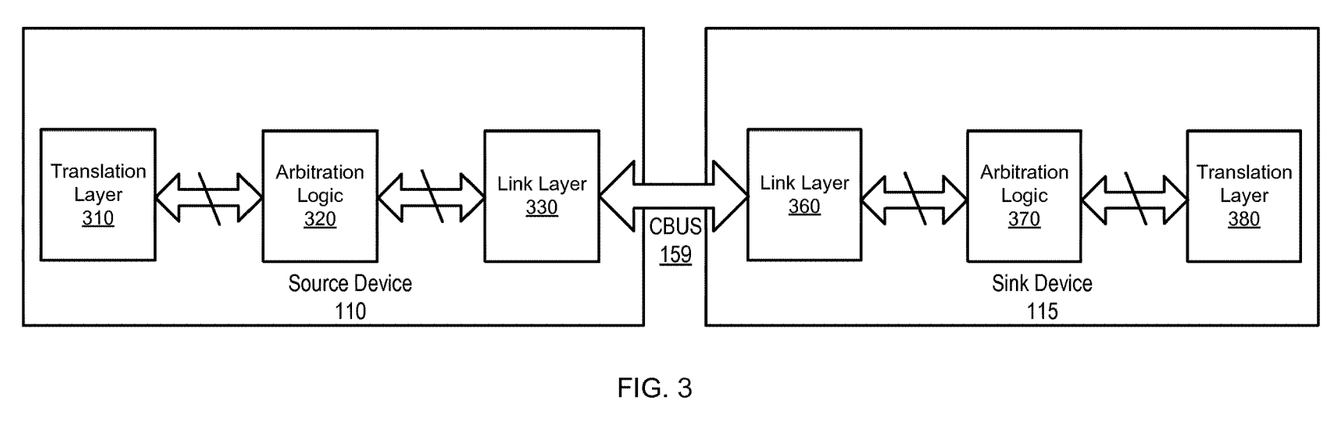
FIG. 3 includes a block diagram illustrating a source device and a sink device communicatively coupled via a multimedia link, according to some embodiments.

FIG. 3 includes a block diagram illustrating a source device 110 and a sink device 115 communicatively coupled via a multimedia link (in particular, via control bus CBUS 159), according to some embodiments. When communicatively coupled to the multimedia sink device 115, the multimedia source 110 device transmits multimedia data streams (e.g., audio/video/auxiliary streams) to the multimedia sink device over a multimedia channel of the multimedia link. The source device 110 could be a portable computing device (such as a mobile phone, laptop, or hand held device) capable of sourcing multimedia content. A sink device 115, on the other hand, could be a television or a display monitor capable of receiving the multimedia content that is provided to it by the source device. To transmit multimedia content to the sink device 115, the source device 110 includes an interface (not shown) to the multimedia channel of the multimedia link; the interface transmits video and/or audio and/or auxiliary data to the sink device via the multimedia channel. In addition, the source device 110 exchanges control data (e.g., discovery data, display identification, configuration data, remote control commands, and USB tunneling data) with the sink device 115 over the full-duplex control bus (CBUS 159) of the MHL 3 link. To enable this control data exchange, the source device 110 also includes an interface to the full duplex control channel or control bus of the multimedia link. In some embodiments, the interface to the full duplex control channel of the multimedia link includes a full-duplex link layer circuit 330. Functions of the link layer 330 include providing link layer protocol commands, link layer flow control, bit timings, and packet timings at the local device for transfer of packet data across the control bus. The link layer 330 implements link layer protocols for sending and receiving control data between the source device 110 and sink device 115 across the control bus 159. The link layer protocols specify schemes for framing control data (e.g. encoding, protocol, arbitration, flow control, bit timings, packet timings) into link layer packets. For example, for legacy MHL, the link layer 330 may generate link layer packets for CBUS related data that include one or more sync bits, header bits, control bits, data or command bits for translation layer data, and parity bits. The link layer 330 also decodes incoming packets of CBUS related data from the control bus. The link layer 330 additionally controls timing and synchronization of packets transmitted across the control bus 159 using a TDM (Time Division Multiplexer). TDM divides the use of the control bus into time slots, some of which are for transmitting CBUS related data and some of which are for receiving CBUS related data. By virtue of providing multiple time slots of the control bus, the TDM enables the source device 110 to serve multiple virtual channels. The link layer 330 interfaces with software at the source device 110 via a half duplex translation layer circuit 310. In other words, the half duplex translation layer 310 provides a half duplex interface with the device software. The translation layer circuit 310 additionally facilitates selection of one among several different logical data channels, such that only one logical data channel has access to the control bus 159 at a time. Examples of logical data channels in MHL include DDC (Display Data Channel) and MSC (MHL Sideband Channel). Each logical data channel follows a different flow control protocol for transfer of a different type of control information. Each logical data channel may use different flow control packets. For example, DDC may use seven different flow control packets. MSC may use eighteen different flow control packets. The half-duplex translation layer circuit 310 controls flow of control information between the source device 110 and sink device 115. Specifically, the half-duplex translation layer circuit 310 generates flow control packets and control data packets that are transmitted to the link layer 330. The half-duplex translation layer 310 also receives flow control packets and control data packets from the link layer 330. The half-duplex translation layer circuit 310 only operates in half-duplex, meaning that it can either transmit or receive data through its internal communication interface to the link layer, but cannot do both at the same time.

Therefore, the source device 110 also includes arbitration logic 320 to mediate the communication (signaling) between the full-duplex link layer 330 and the half-duplex translation layer 310. The arbitration logic 320 controls transfer of control data with the sink device 115 via the full duplex control channel or control bus 159. In some embodiments, the arbitration circuit 320 comprises a state machine that controls flow of control data between the half-duplex translation layer circuit 310 and the full-duplex link layer circuit 330.

Similarly, the MHL sink device 115, also includes an interface to the multimedia channel of the multimedia link; the interface receives video and/or audio and/or auxiliary data from a source device 110 via the multimedia channel. The sink device 115 also includes an interface to the full duplex control channel/bus 159 of the multimedia link. In some embodiments, the interface to the full duplex control channel of the multimedia link includes a full-duplex link layer circuit 360. Further, the sink device 115 comprises a half-duplex translation layer circuit 380 to interface with software at the sink device 115. The sink device 115 therefore includes its own arbitration logic 370 to interface or mediate between the full duplex link layer 360 and the half duplex translation layer 380. The arbitration logic 370 at the sink device 115 also functions to control transfer of control data to and from the source device 110 via the full duplex control channel/bus 159. In some embodiments, the arbitration logic 370 of the sink device 115 also comprises a state machine that controls flow of control data between the half-duplex translation layer circuit 380 of the sink device and the full-duplex link layer circuit 360 of the sink device 115. The full-duplex link layer circuit 360, the half-duplex translation layer circuit 380, and the arbitration logic 370 of the sink device 115 share various attributes and functions, respectively, with the full-duplex link layer circuit 330, the half-duplex translation layer circuit 310, and the arbitration logic 320 of the source device 110. For brevity, these details are not repeated here.

Inter-Device Communication in the Absence of Conflict

As described above with reference to FIG. 3, the translation layer circuits 310 and 380 of both the source device 110 and sink device 115 are configured to generate and receive control information. The translation layers operate in half duplex and interface with legacy device software in half duplex. By virtue of being half duplex, the translation layer of either device is configured to perform either one of packet data transmission or packet data receipt at any given time through its internal interfaces to the arbitration logic and device software of that respective device, but not both concurrently. In other words, referring again to FIG. 3, the translation layer 310 or 380 can support packet data transmission from a local device to a peer device by obtaining a control packet from software at the local device, processing the packet, and providing the packet to the link layer 330 or 360 respectively (via the arbitration logic 320 or 370 respectively) for further transmission to the peer device. Alternatively, the translation layer 310 or 380 can support packet receipt at the local device from a peer device by performing the reverse operations—obtaining a received packet from the arbitration logic 320 or 370 respectively, processing the packet, and providing the packet to software at the local device. However, the translation layer 310 or 380 respectively cannot support both packet data transmission and packet data receipt concurrently since it operates in half-duplex.

This constraint resulting from the half duplex nature of the translation layer at the source device 110 or the sink device 115 results in either device being able to perform either one of control data transmit or control data receive at any given instance, but not both. Although this constraint at the translation layer 310 or 380 respectively could result in a potential translation layer conflict when both devices attempt to concurrently exchange control data, such constraint would not result in a conflict when only one of the source or sink devices attempts to transmit control data at any given time.

For example, in a first scenario, when the source device 110 is configured to transmit control data over the control bus 159 to the sink device 115, but the sink device 115 does not attempt to transmit control data back to the source device 110, the sink device 115 is receptive to receiving the control data originating from the source device 110. Under such circumstances, there is no conflict between the source and sink devices. In the absence of such conflict, the source device 110 and the sink device 115 may communicate control data seamlessly over the full-duplex bidirectional enhanced control bus 159 (eCBUS) of the MHL 3 link.

Figure 5A:
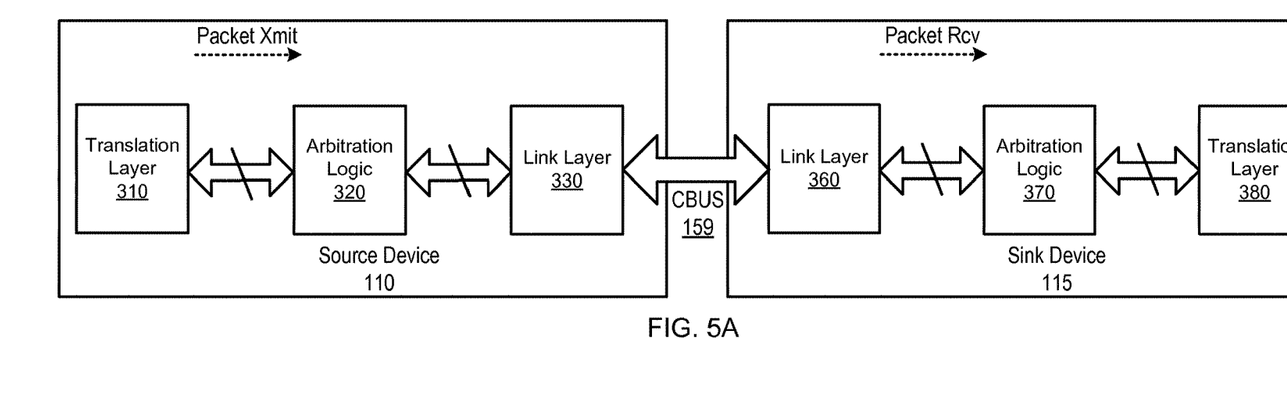
FIGS. 5A-5B include block diagrams illustrating packet transmission from a source device to a sink device in the absence of a data transfer conflict, according to some embodiments.
Figure 5B:
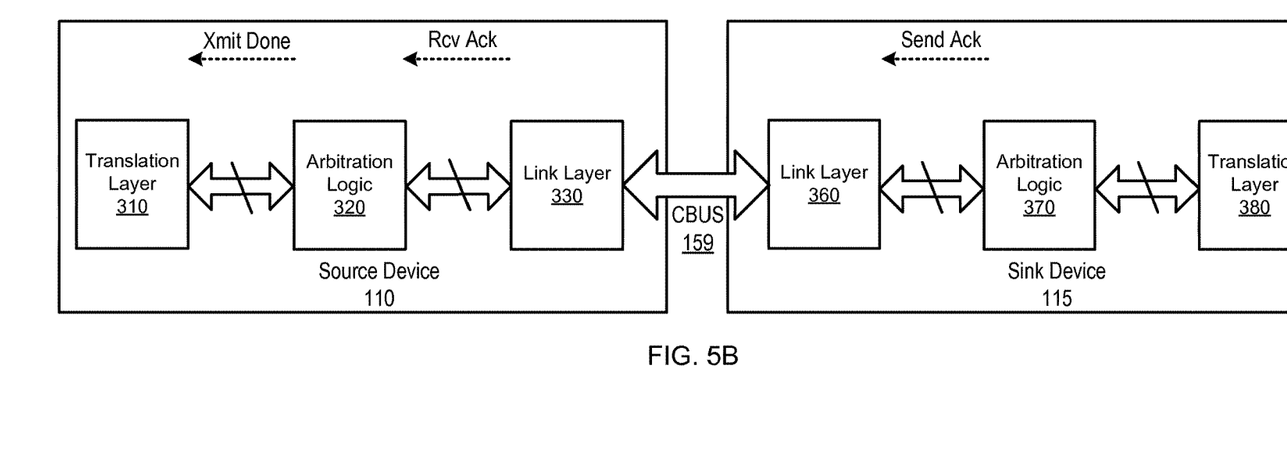

FIGS. 5A-5B include block diagrams illustrating packet transmission from a source device 110 to a sink device 115 in the absence of a data transfer conflict, according to some embodiments.

In this scenario, the source device 110 initiates transmission of control data to the sink device 115 by requesting access to the control bus 159. Specifically, in some embodiments, translation layer 310 at the source device 110 transmits a transmit request to the arbitration logic 320 which, in turn, requests the link layer 330 to obtain access to CBUS 159. The link layer 330 of the source device 110 obtains access to the CBUS 159 and asserts a local grant signal to the arbitration logic 320 of the source device 110 indicating that the source device 110 has gained access to the control bus 159. Then, the source device 110 proceeds to transmit a control packet (Packet Xmit) to the sink device 115. Specifically, the translation layer 310 of the source device initiates packet transmission (Packet Xmit) to transmit control data to the arbitration logic 320. The arbitration logic 320 enters one or more transmission states to propagate the controls packets from the translation layer 310 to the link layer 330.

The sink device 115 receives the control packet (Packet Rcv) from the source device 110. Upon receiving the control packet, the sink device 115 responds (Send Ack) with a positive or negative acknowledgement signal (Send NACK byte) corresponding to that control packet. In particular, the arbitration logic 370 at the sink device 115 may run an error check to determine whether the packet was received in a good (error free) or bad (error-ridden) condition and based on that determination, generate the ACK or NAK signals respectively. Upon receiving the ACK or NAK signal (Rcv Ack), the arbitration logic 320 at the source device 110 may send an indication (Xmit Done) to the translation layer 310 of the source device 110, indicating completion of the transmission event. This completes the transmission process from the source device 110 to the sink device 115 in the absence of inter-device transmission conflict.

Conversely, in a second scenario, if the source device 110 itself is not configured to transmit control data to the sink device 115 at a time when the sink device 115 attempts to transmit control data over the control bus 159 to the source device 110, then at such time, the source device 110 is receptive to receiving the control data originating from the sink device 115. Therefore, no conflict arises at either source device 110 or sink device 115.

Figure 6A:
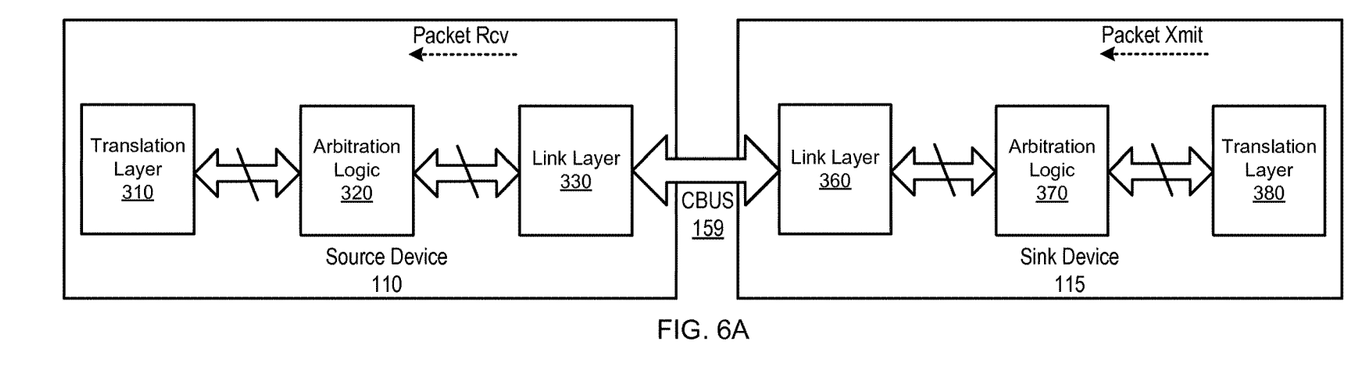
FIGS. 6A-6B include block diagrams illustrating packet transmission from a sink device to a source device in the absence of a data transfer conflict, according to some embodiments.
Figure 6B:
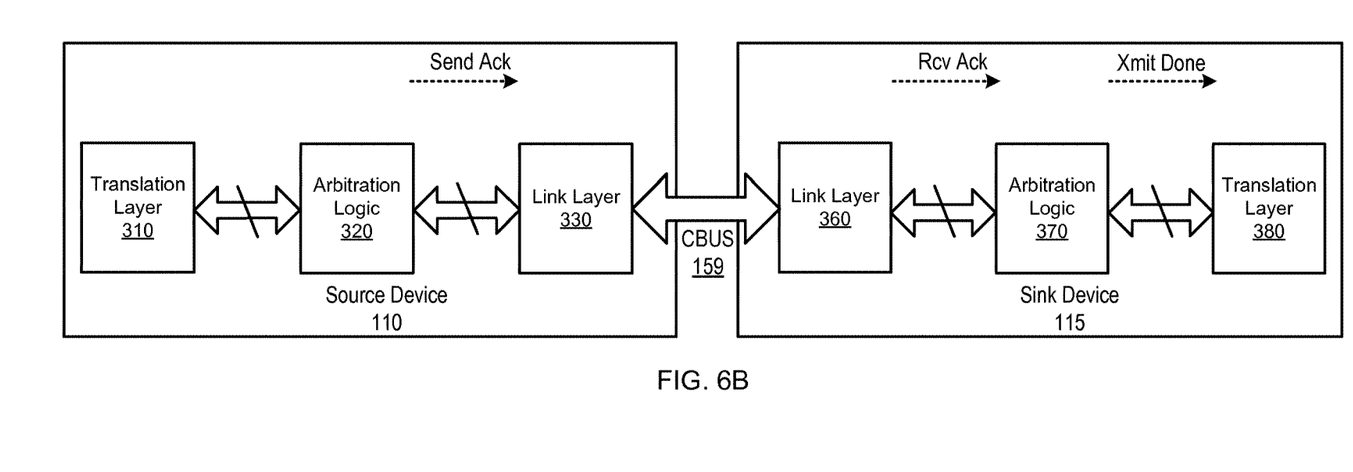

FIGS. 6A-6B include block diagrams illustrating packet transmission from a sink device 115 to a source device 110 in the absence of a data transfer conflict, according to some embodiments. In this scenario, the sink device 115 initiates transmission of control data to the source device 110 by requesting access to the control bus 159. The access request from the arbitration logic 370 may be responsive to the transmission request asserted by the translation layer 380 at the sink device 115. Upon gaining access to the control bus 159, the sink device 115 proceeds to transmit a control packet (Packet Xmit) over the control bus 159 to the source device 110. To do so, the translation layer 380 propagates a control packet (Packet Xmit) to the arbitration logic 370 at the sink device 115, which in turn, propagates the control packet to the link layer 360. Upon receiving the control packet (Packet Rcv), the source device 110 may positively or negatively acknowledge that control packet (Send Ack) to the sink device 115. In particular, the arbitration logic 320 at the source device 110 may run an error check to determine whether the packet was received in a good (error free) or bad (error-ridden) condition and based on that determination, generate the ACK or NAK signals respectively. Upon receiving the ACK or NAK signal (Rcv Ack), the sink device 115 completes the transmission process; for example, a transmit done (Xmit_Done) signal is sent from the arbitration logic 370 of the sink device 115 to the translation layer 380 of the sink device 115 to indicate end of transmission for that packet.

Inter-Device Communication in the Presence of Conflict

Under the circumstances when both the source device 110 and the sink device 115 attempt to transmit control data over the control bus 159 concurrently, substantially concurrently, or within a specified interval of each other, a potential protocol conflict can arise on the control bus 159 as well at the half-duplex translation layer of the source or sink devices. A set of predefined rules and priorities need to be defined a-priori in order to handle translation layer conflict arising under these circumstances.

In the MHL 3 configuration, the source device 110 transmits multimedia data streams (e.g., audio/video/auxiliary streams) to the sink device 115 over a multimedia channel. In other words, the source device 110 is the originator or provider of the multimedia content and the sink device 115 is the receiver or recipient. By virtue of being the originator of the multimedia content, the source device 110 is ascribed multimedia data transmission priority over the sink device 115. The sink device 115, on the other hand, has a more passive 'follower' role in the multimedia data communication process and is therefore ascribed a lower priority than the source device 110. Thus, if conflict arises during the process of exchanging control data, the source device 110 gains priority over the control bus 159. Stated differently, when communicatively coupled to the sink device 115, the source device is given transmission priority to transmit control data to the sink device over the full duplex control channel in the event of a control data transfer conflict arising on the full duplex control channel. These scenarios are described further with reference to the flowcharts illustrated in FIGS. 4A-4B as well as the block diagrams of FIGS. 7A-7B and 8A-8B.

Conflict Handling at the Source Device

Figure 4A:
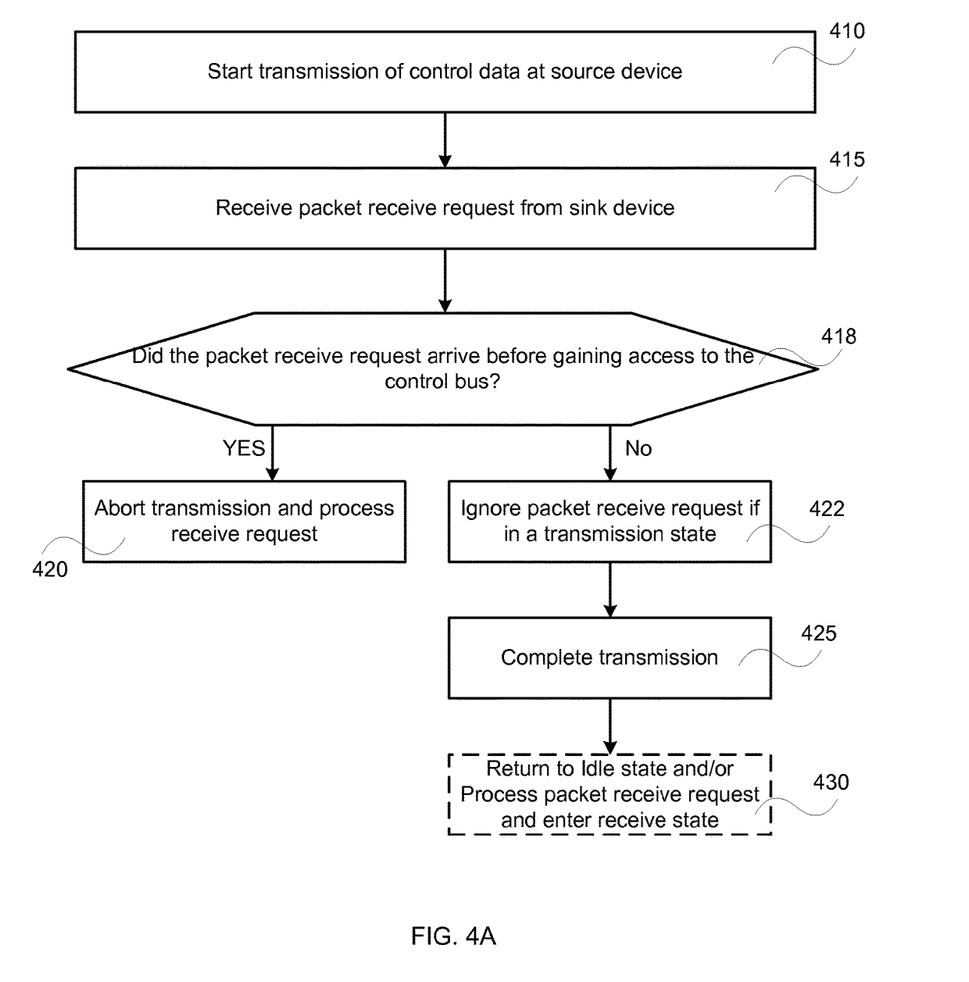
FIG. 4A illustrates a flowchart of a conflict resolution workflow performed on a source device when interfacing with a sink device via a multimedia link, according to some embodiments.
Figure 7A:
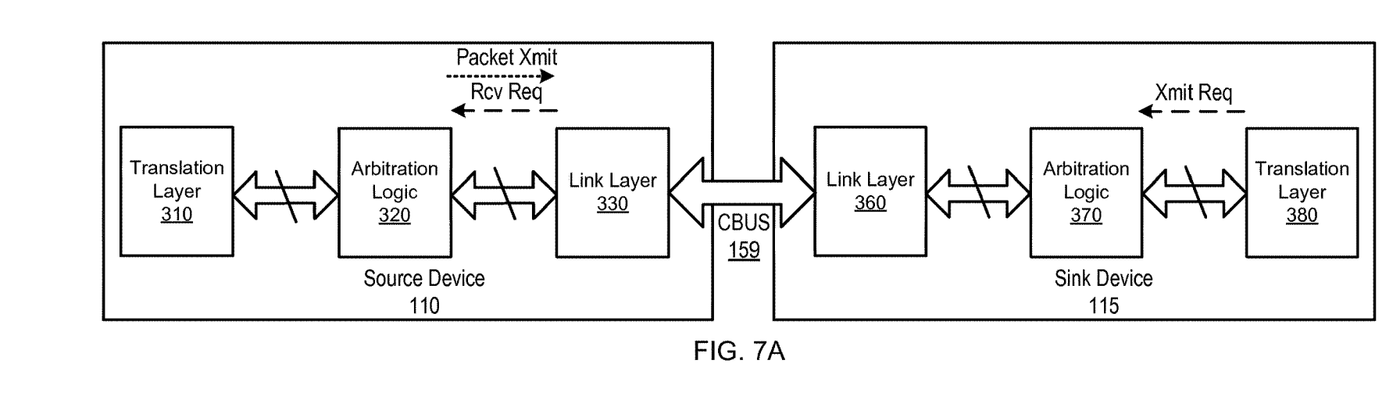
FIGS. 7A-7C include block diagrams illustrating conflict handling signaling performed at a source device, according to some embodiments.
Figure 7B:
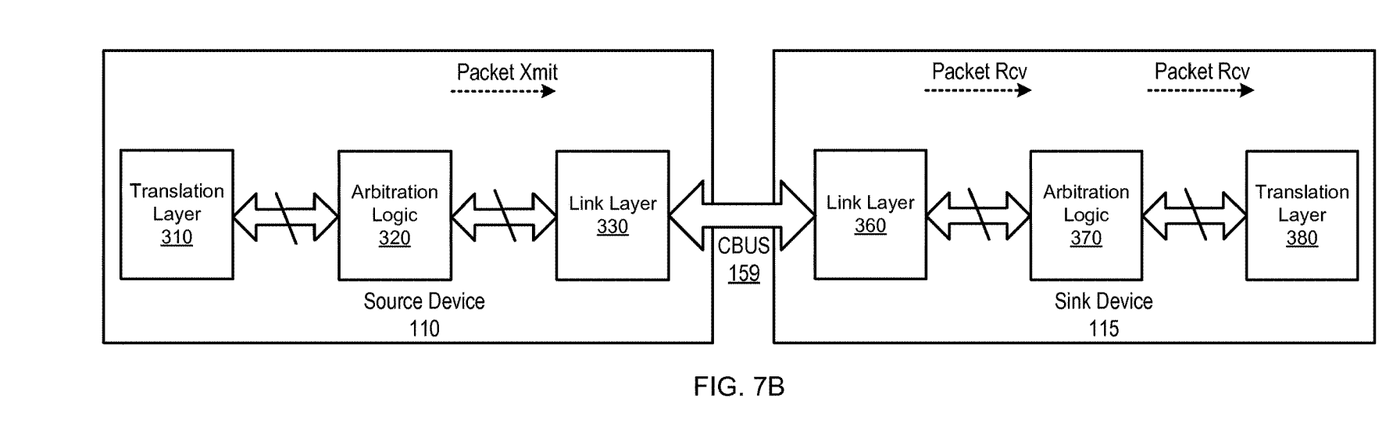

FIG. 4A illustrates a flowchart of a conflict resolution workflow performed on an MHL 3 source device when interfacing with an MHL 3 sink device via an MHL 3 link, according to some embodiments. FIGS. 7A-7B include corresponding block diagrams illustrating conflict handling signaling performed at a source device 110, according to some embodiments.

By virtue of being the originator of the multimedia content, the source device is ascribed transmission priority over the sink device. By virtue of being the 'follower' or recipient, the sink device has the lower priority. If inter-device conflict arises while the source device is transmitting outbound control data to the sink device, priority is given to the source device—source to sink device transmission prevails at the expense of an incoming receive request from the sink device. Specifically, the arbitration logic of the source device ignores requests to receive inbound control data from the sink device while the source device is transmitting outbound control data to the sink device. This is described further with reference to FIG. 4A and FIGS. 7A-7B. For simplicity and ease of explanation, FIG. 4A and FIGS. 7A-7B are described together.

As shown in FIG. 4A, the source device starts 410 transmission of control data. For example, referring to FIGS. 7A-7B, the arbitration logic 320 at the source device 110 receives a control data transmission request from the translation layer 310 of the source device 110. The arbitration logic 320 then initializes a packet transmission event by entering one or more transmission states for transmitting outbound control data to the sink device 115. In some embodiments, the arbitration logic 320 initializes a packet transmission event (Packet Xmit) after asserting a transmission request signal to the link layer 330 of the source device 110, and after receiving, from the link layer 330, a local transmission grant signal authorizing access to the full duplex control channel/bus 159. A control packet that includes three bytes of control data—including a header byte, a higher order byte, and a lower order byte—is received from the translation layer 310 and transmitted through the link layer 330. In such embodiments, the one or more transmission states correspond to a header transmission state, a higher order byte transmission state, and a lower order byte transmission state. In addition, the transmission states also include a stop transmission state during which the source device 110 awaits a positive or a negative acknowledgement signal from the sink device 115.

Referring again to FIG. 4A, the source device 110 receives 415 a packet receive request from the sink device 115. As illustrated in FIGS. 7A-7B, the translation layer 380 at the sink device 115 asserts a transmit request (Xmit Req) to transmit packets to the source device 110. This transmit request (Xmit Req) is propagated via the arbitration logic 370 and the link layer 360, over CBUS 159, to the source device 110. The source device in turn receives this request as a packet receive request (Rcv Req) corresponding to a request to receive inbound control data from the sink device 115. As illustrated in FIG. 4A, in some embodiments, the arbitration logic makes a determination 418 as to whether the packet receive request arrived before the source device gained access to the control bus. In such embodiments, if the arbitration logic 320 receives a request to receive inbound control data from the sink device 115 after asserting a transmission request signal to the link layer 330 of the source device 110 and before receiving, from the link layer 330, a transmission grant signal (i.e., before gaining access to the control bus), the arbitration logic 320 aborts 420 transmission by de-asserting the transmission request signal and processes the request to receive inbound control data from the sink device 115.

However, in the alternate, if the arbitration logic 320 receives the packet receive request (Rcv Req) from the sink device 115 after receiving a transmission grant and while the arbitration logic 320 is in one of the packet transmission states, the arbitration logic 320 proceeds to complete transmission; i.e. the source device 110 ignores 422 the receive request (Rcv Req) originating at the sink device 115. If the arbitration logic 320 of the source device 110 has already initiated packet transmission (Packet Xmit), then, responsive to receiving a request (Rcv Req) to receive inbound control data from the sink device 115, the arbitration logic 320 determines whether the packet transmission event at the source device 110 is completed. In some embodiments, determining whether the packet transmission event at the source device 110 is completed comprises determining whether a positive or a negative acknowledgement signal was received from the sink device corresponding to the packet transmission event. In accordance with a determination that the packet transmission event is not completed, the arbitration logic 320 ignores the request to receive inbound control data from the sink device 115 by continuing the packet transmission event (as illustrated in FIG. 7B). In other words, the source device ignores 420 packet receive request if in a transmission state.

Figure 7C:
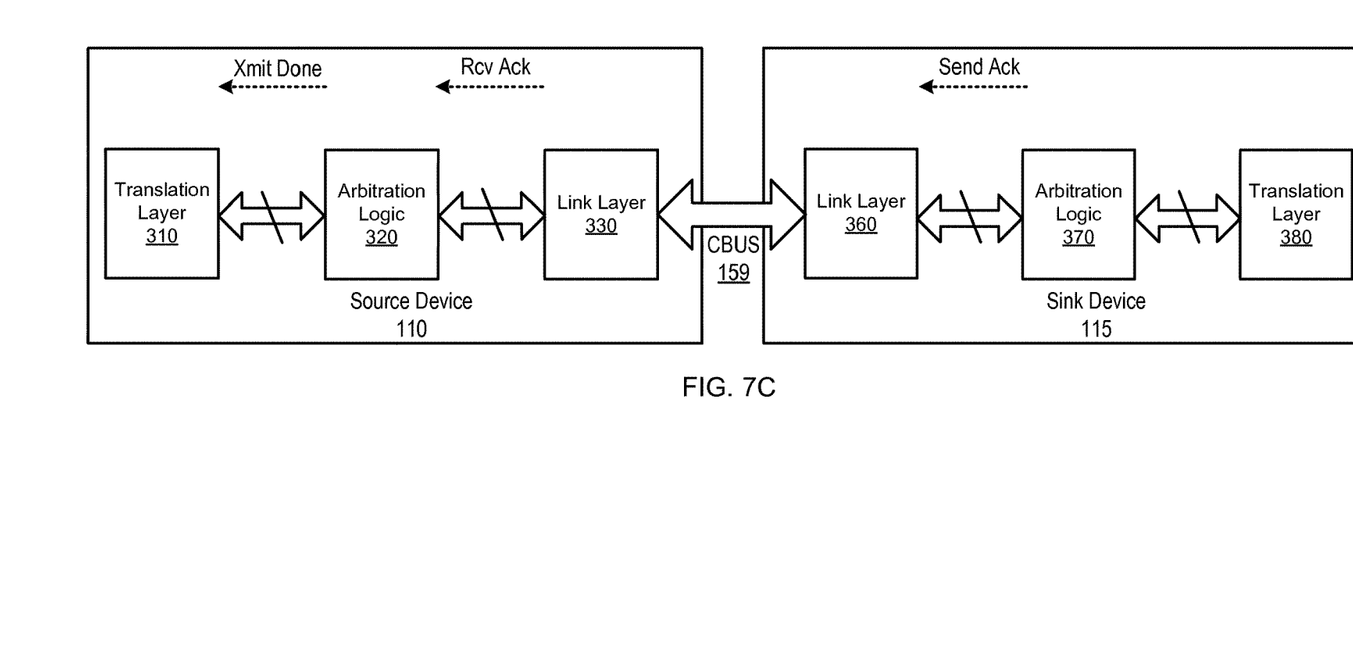

The source device then completes 425 transmission. For example, as illustrated in FIG. 7C, the source device receives a positive or negative acknowledgement (Rcv Ack) signal from the sink device (Send Ack). The arbitration logic 320 at the source device exits the transmission states by transmitting a transmit done (Xmit Done) signal to the translation layer 310 indicating an end of the packet transmission event.

Upon completing transmission, the arbitration logic 320 enters 430 an idle state. Additionally, if the packet receive request is detected again, the source device optionally processes 430 the packet receive request. To do so, the arbitration logic 320 may enter a receive state during which control data from the sink device is received.

Conflict Handling at the Sink Device

Figure 4B:
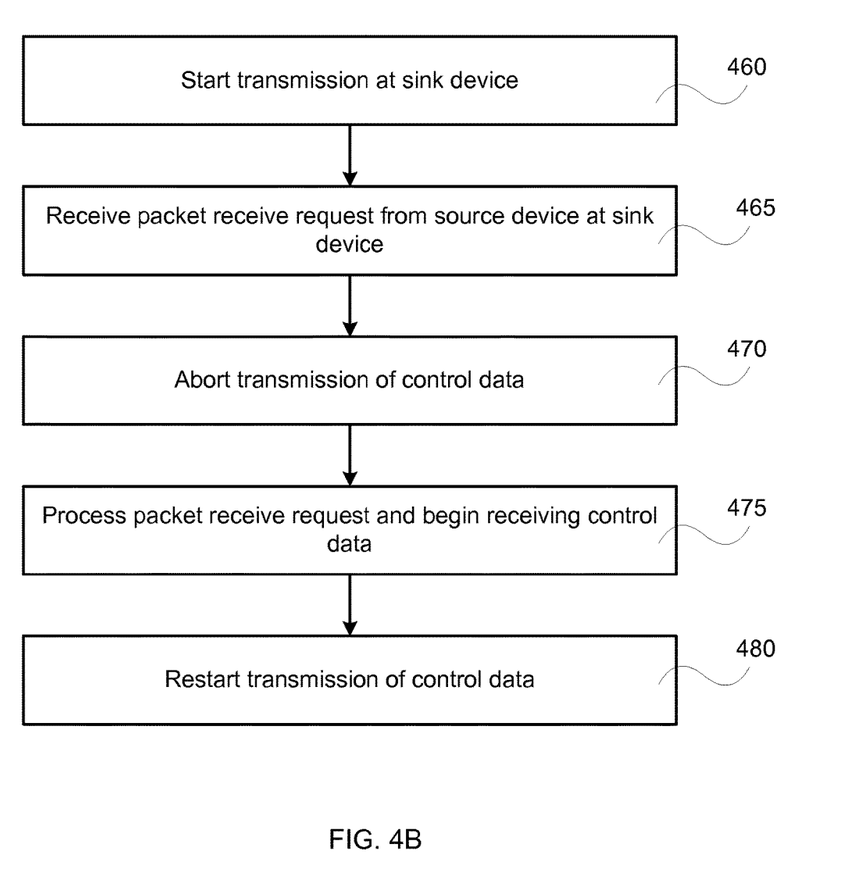
FIG. 4B illustrates a flowchart of a conflict resolution workflow performed on a sink device when interfacing with a source device via a multimedia link, according to some embodiments.
Figure 8A:
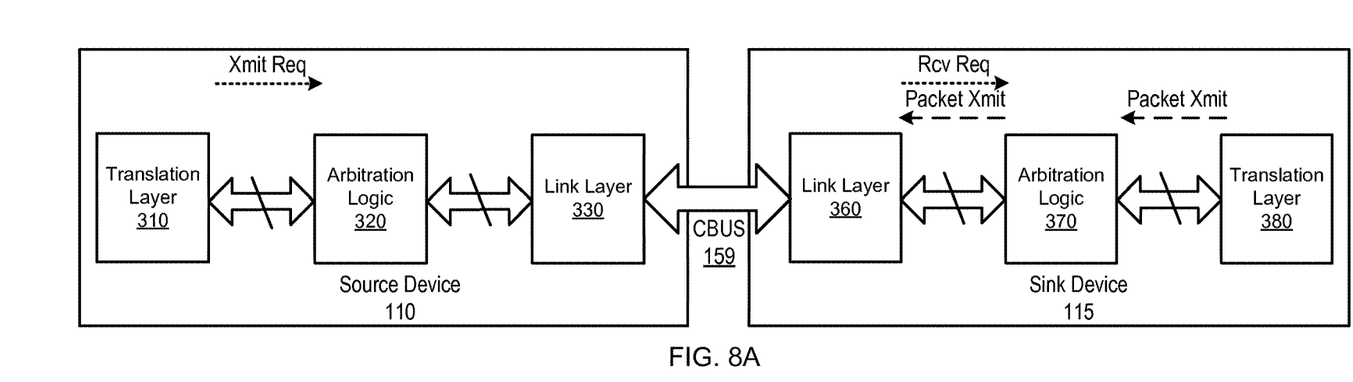
FIGS. 8A-8C include block diagrams illustrating conflict handling signaling performed at the sink device, according to some embodiments.
Figure 8B:
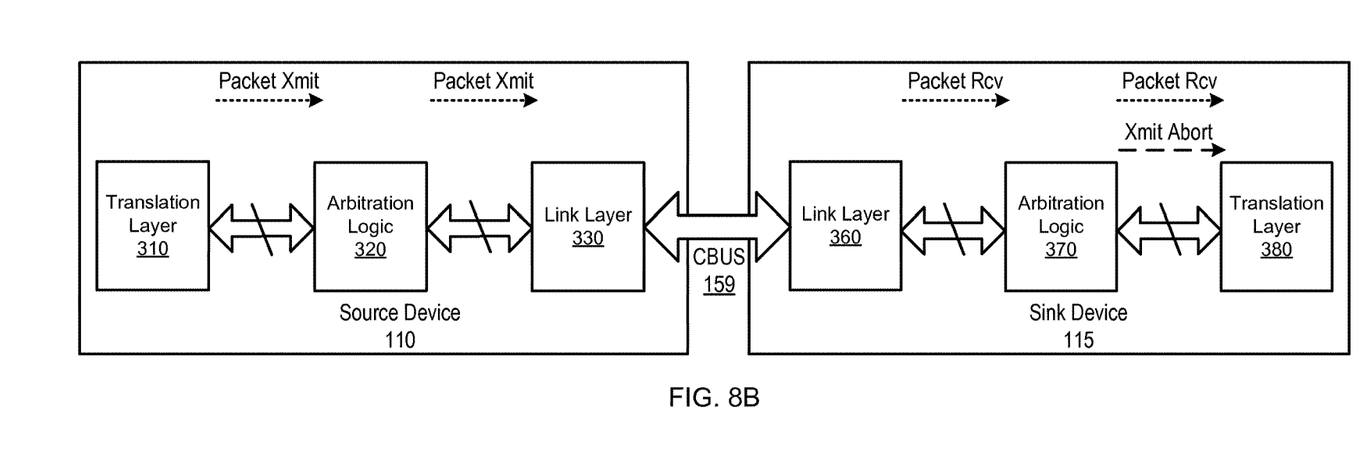

FIG. 4B illustrates a flowchart of a conflict resolution workflow performed on an MHL 3 sink device when interfacing with an MHL 3 source device via an MHL 3 link, according to some embodiments. FIGS. 8A-8B include block diagrams illustrating conflict handling signaling performed at the sink device 115, according to some embodiments. For simplicity and ease of explanation, FIG. 4B and FIGS. 8A-8B are described together.

Again, since the sink device is the 'follower' or recipient of the multimedia content, the sink device has the lower transmission priority. If inter-device conflict arises while the sink device is transmitting outbound control data to the source device, priority is given to the source device—sink to source device transmission is aborted (e.g., temporarily suspended) in favor of an incoming receive request from the source device. In other words, the arbitration logic of the sink device stops transmitting outbound control data via the full duplex control channel responsive to receiving a request to receive incoming control data from the source device. This is described with reference to FIG. 4 and FIGS. 8A-8B.

First, as illustrated in FIG. 4B the sink device starts 460 transmission of control data. For example, referring to FIG. 8A, the arbitration logic 370 receives a control data transmission request from the translation layer 380. The arbitration logic 370 then requests and is granted access to the control bus 159. After receiving access to the control bus 159, the arbitration logic 370 initializes a packet transmission event by entering one or more transmission states for transmitting outbound control data to the source device 115. As described above, in some embodiments, the transmitted packet has 3 bytes of control data—the header, a higher order byte, and a lower order byte. Thus, in such embodiments, a transmission event includes a header transmission state indicating a start of the packet transmission event, a higher order byte transmission state, and a lower order byte transmission state. The transmission states at the sink device 115 also include a stop transmission state during which the source device 110 awaits a positive or a negative acknowledgement signal from the sink device 115.

Returning to FIG. 4B, the sink device receives 465 a packet receive request (e.g., a request to receive inbound control data) from the source device. In some embodiments, as illustrated in FIG. 8A, the sink device 115 receives the packet receive request (Rcv Req) after gaining access to the control bus 159 and, after the arbitration logic 370 at the sink device 115 has initiated a packet transmission event (Packet Xmit) by entering one of the transmission states. In other words, the sink device 115 receives the request to receive inbound control data (Rcv Req) during one or more of its transmission states. Responsive to receiving the request to receive inbound control data from the source device 110, the arbitration logic 370 at the sink device determines whether the packet transmission event at the sink device 115 is completed. For example, the arbitration logic 370 determines whether a positive or a negative acknowledgement signal was received from the source device 110 corresponding to the transmitted packet for that packet transmission event.

If the sink device 115 receives the request to receive inbound control data from the source device 110 during the packet transmission event, the sink device aborts 470 transmission. In other words, based on a determination that the packet transmission event is not completed, the arbitration logic at the sink device suspends the packet transmission event to the source device by entering a transmission abort state. For example, as illustrated in FIG. 8B, arbitration logic 370 at the sink device 115 sends a transmit abort (Xmit Abort) signal to translation layer 380 at the sink device 115. Upon receiving the transmit abort, the translation layer 380 at the sink device 115 suspends (e.g., temporarily, for a specified period of time) its transmission state.

In some embodiments, along similar lines as described with reference to the source device 110, if the sink device 115 receives the packet receive request (Rcv Req) from the source device 110 after requesting access to the control bus 159 but before gaining access to the control bus, the sink device 110 may still abort the transmission event. But, in contrast to the source device 110, which ignores a receive request that is received after the source device 110 obtains access to the control bus, the sink device 115 aborts transmission even if the request is received from the source device 110 after the sink device gains access to the control bus—in favor of processing the receive request originating at the source device 110. Thus, regardless of the relative timing of the receive request from the source device in relation to the sink device obtaining access to the control bus, the source device request is favored at the expense of the sink device transmission event.

Returning to FIG. 4B, upon aborting transmission, the sink device 115 processes 475 packet receive request. For example, referring to FIG. 8B, arbitration logic 370 at the sink device 115 initializes or enters a packet receipt event to receive incoming control data (Packet Rcv) from the source device 110. Control data is received during the packet receipt event. In some embodiments, the arbitration logic enters one or more packet receive states to receive and process the inbound control data.

Figure 8C:
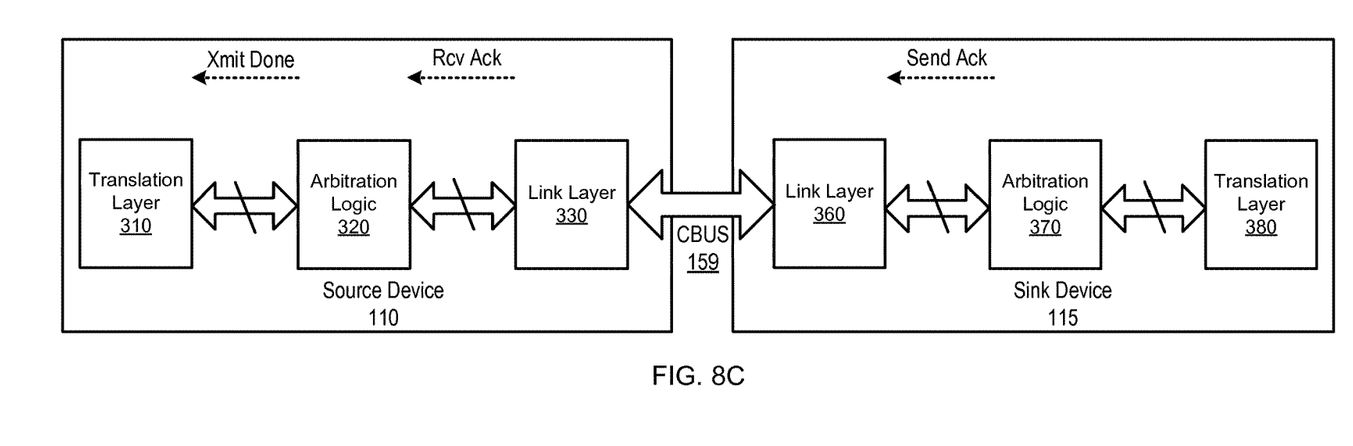

Then, after completing packet receipt, as illustrated in FIG. 8C, the sink device (arbitration logic 370) transmits a positive or negative acknowledgement signal (Send Ack) to the source device (Send Ack). The source device 110 receives the acknowledgement (Rcv Ack) signal and the arbitration logic 320 at the source device 100 exits the transmission states by transmitting a transmit done (Xmit Done) signal to the translation layer 310 indicating an end of the packet transmission event.

Referring to FIG. 4B, after completing packet receipt, the sink device optionally restarts 480 transmission of control data. In some embodiments, responsive to completing the packet receipt event, the arbitration logic 370 of the sink device 115 enters an idle state and determines whether a request to transmit outbound control data is asserted again at the sink device 115. If the transmit request (Xmit Req) is detected at the sink device 115, the arbitration logic 370 at the sink device 115 resumes the packet transmission event (Packet Xmit) by re-entering the one or more transmission states for transmitting the outbound control data to the source device 110.

In some embodiments, for the single transmission event described with reference to FIG. 4A-4B, 5A-5B, 6A-6B, 7A-7B, or 8A-8B, the control data may comprise a plurality of control bytes. In such embodiments, the plurality of control bytes may be transmitted non-continuously, in sub-portions (e.g., 1 byte at a time), or intermittently (e.g., interleaved or temporally separated by specified durations of time). For example, various sub-portions of a single control packet may be transmitted during a plurality of distinct and non-adjacent TDM timeslots of the control bus 159. For example, if the control bus 159 is divided into 'n' TDM timeslots per TDM period, and a single control packet for a single transmission event comprises 3 bytes of control data (including a first, second, and third control byte), the first byte may be transmitted during a specified (e.g., predefined)

TDM timeslot of a first TDM period, the second byte may be transmitted during the corresponding TDM timeslot of a next (second consecutive) TDM period, and the third byte may be transmitted during the corresponding TDM timeslot of the subsequent (third consecutive) TDM period. Thus, in this example, although the three control bytes may not be transmitted continuously or contiguously in time, but rather over three distinct TDM periods, mutually separated from one another by one or more TDM timeslots, it should be understood that the entire event corresponding to the transmission of the three control bytes as well as the receipt of the ACK/NAK signal from the peer device is considered to be one single transmission event corresponding to that single control packet.

Beneficially, embodiments of this disclosure permit reusability and backwards compatibility of one or more components of the legacy MHL device when interfacing with an enhanced MHL device via an enhanced MHL 3 link. In particular, the legacy half duplex translation layer can be reused to interface with both the legacy MHL 1/2 software as well as with a full duplex eCBUS of the enhanced MHL (MHL 3) link. Potential translation layer conflicts arising at the source or sink devices can be averted or resolved by enforcing the predefined set of transmission rules and priorities disclosed herein. Therefore, embodiments of the disclosure enable reusability of legacy software originally designed for compatibility with components of the legacy MHL device and legacy MHL link, with the enhanced (MHL 3) architecture.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the disclosure and its practical applications, to thereby enable others skilled in the art to best utilize the embodiments with various modifications as are suited to the particular use contemplated.

What is claimed is:

1. A communication system comprising:
    a multimedia link having a full duplex control channel;
    a source device comprising a source half duplex translation layer circuit and a source link layer circuit communicatively coupled to the source half duplex translation layer circuit, the source half duplex translation layer circuit to interface with software of the source device in half duplex while the source link layer circuit interfaces with a sink device via the full duplex control channel in full duplex, the source half duplex translation layer circuit to generate first outbound control data, the source link layer circuit coupled to the full duplex control channel and to receive the first outbound control data from the source half duplex translation layer circuit; and
    the sink device comprising a sink half duplex translation layer circuit and a sink link layer circuit communicatively coupled to the sink half duplex translation layer circuit, the sink half duplex translation layer circuit to interface with software of the sink device in half duplex while the sink link layer circuit interfaces with the source device via the full duplex control channel in full duplex, the sink half duplex translation layer circuit to generate second outbound control data, the sink link layer circuit coupled to the full duplex control channel and to receive the second outbound control data from the sink half duplex translation layer circuit;
    wherein the source device is configured to transmit the first outbound control data generated by the source half duplex translation layer circuit to the sink device via the full duplex control channel, wherein the source device is configured to ignore requests to receive first inbound control data from the sink device while the source device is transmitting the first outbound control data to the sink device, and
    wherein the sink device is configured to transmit the second outbound control data generated by the sink half duplex translation layer circuit to the source device via the full duplex control channel, wherein the sink device is configured to stop transmitting the second outbound control data responsive to receiving a request to receive second inbound control data from the source device.

2. The method of claim 1, wherein, when communicatively coupled to the sink device, the source device is configured to have transmission priority to transmit control data to the sink device over the full duplex control channel in an event of a data transfer conflict arising on the full duplex control channel.

3. A source device for communicating over a multimedia link, the source device comprising:
    a half duplex translation layer circuit configured to interface with software of the source device in half duplex by obtaining an outbound control packet from the software in half duplex and processing the outbound control packet to generate outbound control data;
    a link layer circuit communicatively coupled to the half duplex translation layer circuit and for coupling to a full duplex control channel of the multimedia link, the link layer circuit to exchange control data with a sink device in full duplex and to receive the outbound control data from the half duplex translation layer circuit, the control data including the outbound control data and inbound control data received from the sink device, the link layer circuit to interface with the sink device in full duplex while the half duplex translation layer circuit interfaces with the software in half duplex; and
    an arbitration logic circuit to control transfer of the control data with the sink device via the full duplex control channel, the arbitration logic circuit to control the source device to ignore requests to receive the inbound control data from the sink device while the source device is transmitting the outbound control data generated by the half duplex translation layer circuit to the sink device through the link layer circuit.

4. The source device of claim 3,
    the arbitration logic circuit to initialize a packet transmission event by entering one or more transmission states for transmitting the outbound control data to the sink device; and
    during the one or more transmission states, the arbitration logic circuit to receive a request to receive the inbound control data from the sink device.

5. The source device of claim 4, the arbitration logic circuit to initialize the packet transmission event after asserting a transmission request signal to the link layer circuit, and after receiving, from the link layer circuit, a transmission grant signal authorizing access to the full duplex control channel.

6. The source device of claim 4, wherein the one or more transmission states correspond to a header transmission state indicating a start of the packet transmission event, a higher order byte transmission state, a lower order byte transmission state, or a stop transmission state during which the source device awaits a positive or a negative acknowledgement signal from the sink device.

7. The source device of claim 5, responsive to receiving a request to receive the inbound control data from the sink device after asserting a transmission request signal to the link layer circuit of the source device and before receiving, from the link layer circuit, a transmission grant signal, the arbitration logic circuit to abort transmission by de-asserting the transmission request signal and to process the request to receive the inbound control data from the sink device.

8. The source device of claim 4,
responsive to receiving a request to receive the inbound control data from the sink device, the arbitration logic circuit to determine whether the packet transmission event at the source device is completed; and
in accordance with a determination that the packet transmission event is not completed, the arbitration logic circuit to ignore the request to receive the inbound control data from the sink device by continuing the packet transmission event.

9. The source device of claim 8, wherein, determining whether the packet transmission event at the source device is completed comprises determining whether a positive or a negative acknowledgement signal was received from the sink device corresponding to the packet transmission event.

10. The device of claim 3, wherein:
the arbitration logic circuit comprises a state machine to control flow of the control data between the half duplex translation layer circuit and the link layer circuit.

11. A sink device for communicating over a multimedia link, the sink device comprising:
a half duplex translation layer circuit configured to interface with software of the sink device in half duplex by obtaining an outbound control packet from the software in half duplex and processing the outbound control packet to generate outbound control data;
a link layer circuit communicatively coupled to the half duplex translation layer circuit and for coupling to a full duplex control channel of the multimedia link, the link layer circuit to exchange control data with a source device in full duplex and to receive the outbound control data from the half duplex translation layer circuit, the control data including the outbound control data and inbound control data received from the sink device, and the link layer circuit to interface with the source device in full duplex while the half duplex translation layer circuit interfaces with the software in half duplex; and
arbitration logic circuit to control transfer of the control data with the source device via the full duplex control channel, the arbitration logic to abort transmitting the outbound control data via the full duplex control channel responsive to receiving a request to receive the inbound control data from the source device.

12. The sink device of claim 11,
the arbitration logic circuit to initialize a packet transmission event by entering one or more transmission states for transmitting the outbound control data to the source device; and
during the one or more transmission states, the arbitration logic circuit to receive a request to receive the inbound control data from the source device.

13. The sink device of claim 12, wherein:
responsive to receiving a request to receive the inbound control data from the source device, the arbitration logic circuit to determine whether the packet transmission event at the sink device is completed; and
in accordance with a determination that the packet transmission event is not completed, the arbitration logic circuit to suspend the packet transmission event to the source device by entering a transmission abort state and by initializing a packet receipt event to receive the inbound control data from the source device.

14. The sink device of claim 13,
responsive to completing the packet receipt event, the arbitration logic circuit to enter an idle state and to determine whether a request to transmit the outbound control data is still asserted at the sink device; and
responsive to determining that the request to transmit the outbound control data is still asserted, the arbitration logic circuit to resume the packet transmission event by re-entering one or more transmission states for transmitting the outbound control data to the source device.

15. The source device of claim 3, the half duplex translation circuit to interface with the software of the source device by processing the inbound control data to generate an inbound control data packet and providing the inbound control data packet to the software in half duplex.

16. The sink device of claim 11, the half duplex translation circuit to interface with the software of the sink device by processing the inbound control data to generate an inbound control data packet and providing the inbound control data packet to the software in half duplex.

* * * * *

UNITED STATES PATENT AND TRADEMARK OFFICE
CERTIFICATE OF CORRECTION

PATENT NO.       : 10,043,480 B2
APPLICATION NO.  : 14/474005
DATED            : August 7, 2018
INVENTOR(S)      : Jiong Huang et al.

Page 1 of 1

It is certified that error appears in the above-identified patent and that said Letters Patent is hereby corrected as shown below:

In the Claims

Column 14, Claim 2, Line 18, delete "The method of claim 1" and insert --The communication system of claim 1--.

Signed and Sealed this
Twelfth Day of March, 2019

Andrei Iancu
*Director of the United States Patent and Trademark Office*